No. 676,641. Patented June 18, 1901.
I. H. VENN.
GEARING.
(Application filed Oct. 2, 1899.)
(No Model.)
Fig. 1.
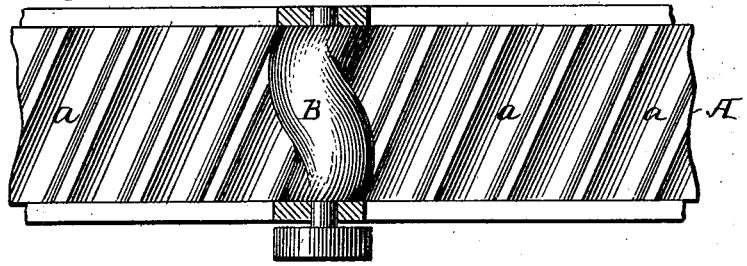
Fig. 2.
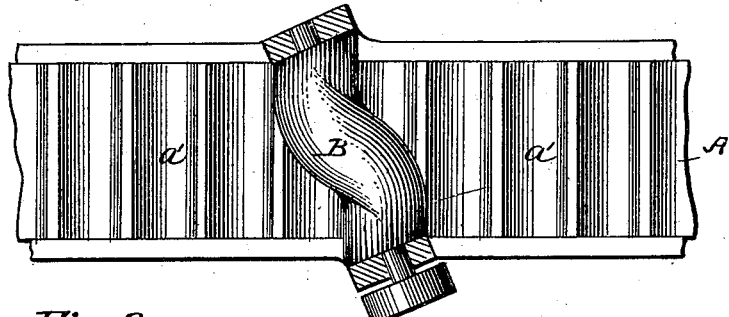
Fig. 3. Fig. 7.
Fig. 6.
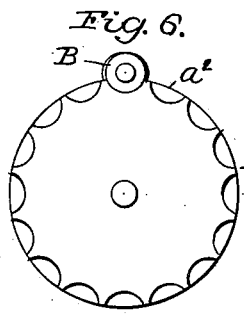
Fig. 4.
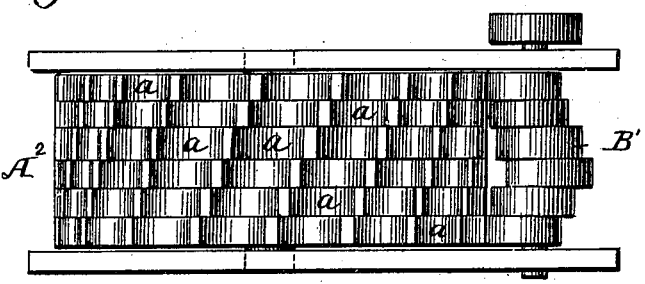
Fig. 5.
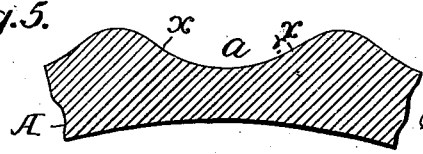
Witnesses
J. G. Hinkel
H. M. Gillman Jr.
Inventor
Isaac H. Venn
by
Foren Freeman
Attorneys
THE NORRIS PETERS CO., PHOTO-LITHO., WASHINGTON, D. C.

UNITED STATES PATENT OFFICE.

ISAAC H. VENN, OF YONKERS, NEW YORK, ASSIGNOR TO THE OTIS ELEVATOR COMPANY, OF EAST ORANGE, NEW JERSEY.

GEARING.

SPECIFICATION forming part of Letters Patent No. 676,641, dated June 18, 1901.

Application filed October 2, 1899. Serial No. 732,370. (No model.)

*To all whom it may concern:*

Be it known that I, ISAAC H. VENN, a citizen of the United States, residing at Yonkers, in the county of Westchester and State of New York, have invented certain new and useful Improvements in Gearing, of which the following is a specification.

My invention relates to certain improvements in gearing; and it consists of a gear in which there are two members, one having a series of parallel grooves and the other being of a substantially spiral form, which by its rotation in operation imparts movement to the opposite member, but locks the same when at rest, as fully set forth hereinafter and as illustrated in the accompanying drawings, in which—

Figure 1 is a plan view showing my improved gear in connection with a rack-bar. Fig. 2 shows another application in connection with the rack-bar; Fig. 3, a view showing the invention in connection with a rotating driven member, and Fig. 4 a view illustrating a different mode of constructing the parts. Fig. 5 is a view showing the form of the groove of the driven wheel when accurately proportioned; Fig. 6, a side view, reduced size, of the gears of Fig. 3; Fig. 7, a side view, reduced size, of the gears of Fig. 4.

The improved gear consists, essentially, of two members, of which one may either be a longitudinally moving or reciprocating bar or wheel driven by the other, which is mounted to rotate upon a longitudinal axis which is circular in cross-section and twisted or formed so as to correspond exteriorly to a cylindrical spiral.

In Fig. 1 the member A is provided with parallel grooves $a$, which are adapted in transverse section to the shape of the member B in transverse section, the parts being so proportioned that when the two members are in engagement some portion of the member B will extend into and fit some portion of one of the grooves $a$ of the member A, whereby on the rotation of the member B there will be a lateral progression of the points of contact between the two members until one of the grooves $a$ will pass from contact with the member B at one end, while the opposite end of the member B will engage the nearest end of the following groove. It thus follows that the rotation of the member B imparts a movement to the member A as a pinion will impart motion to a rack or wheel; but the member A is prevented from imparting any movement to the member B and is absolutely locked thereby when the parts are at rest even more positively than a worm-wheel is locked by the worm.

The axis of the member B—that is, the axis around which it rotates—will be at an angle to the longitudinal direction of the grooves $a$. The latter may be upon a rack or bar and may extend diagonally, as in Fig. 1, in which case the axis of the member B may be at right angles to the direction of movement of the member A, or the grooves $a\ a'$ may be at right angles to the direction of the movement of the member A, in which case the axis of the member B is inclined, as shown in Fig. 2.

In Fig. 3 the member A' is illustrated as a wheel with the grooves $a^2$ extending at an angle to the axis of the wheel; but they may be parallel thereto, in which case the axis of the member B will be inclined to the axis of the member A. The faces of the grooves instead of corresponding to a section of a cylinder may be stepped, as in Fig. 4, the member $A^2$ in such case consisting of a series of disks, each with a series of notches at the periphery and one turned to be slightly in advance of the other, and the member B' in such case will consist of a series of round disks arranged with their centers coincident with a spiral axis. This has the advantage over the construction shown in Figs. 1 and 3 that there is no tendency when the member $A^2$ is caused to bear upon the member B' to thrust the latter longitudinally. The grooves to be accurately made should not conform precisely to the face of a cylinder, but should be of the form shown in Fig. 5, where the bottoms are parts of a curve; but at each edge there is an approximately flat face $x$, as is essential at the point where the edge of the driving-disk rolls on the part with which it is in contact.

The gearing above described may be applied to a rack or wheel gear whenever it is desired to drive the grooved member by the other, but to lock the grooved member when at rest. The gears are therefore specially serviceable as a substitute for worm and wheel gearing in lifting apparatus, &c., and have the advantage that the parts may be much more readily formed than in the case of a worm-gear.

Without limiting myself to the precise construction and arrangement shown, I claim—

1. A gear consisting of a member having transverse grooves, and a rotary engaging member having a cylindrical spiral form and engaging said grooves, substantially as set forth.

2. A gear consisting of a member having transverse inclined grooves, and an engaging member having a cylindrical spiral form and engaging said groove, substantially as set forth.

3. A gear consisting of a member having transverse grooves, and an engaging member having a cylindrical spiral form and engaging said grooves, and of a cross-sectional form adapted to said grooves, substantially as set forth.

4. A gear consisting of a wheel having transverse grooves at the periphery and a driving member cylindrical in cross-section but spiral externally, substantially as set forth.

5. A gear consisting of a member having transverse grooves each stepped to form a series of curved faces one in advance of the other, and an engaging member consisting of a series of disks with their centers upon a spiral axis, and adapted to said grooves, substantially as set forth.

6. A gear consisting of a member having transverse grooves, each curved transversely at the bottom and flattened toward the edges, and a rotary engaging member having a cylindrical spiral form and engaging said grooves, substantially as set forth.

7. A gear consisting of a member having transverse grooves each stepped to form a series of curved faces one in advance of the other and flattened near their edges as specified, and an engaging member consisting of a series of disks with their centers upon a spiral axis and adapted to said grooves, substantially as set forth.

In testimony whereof I have signed my name to this specification in the presence of two subscribing witnesses.

ISAAC H. VENN.

Witnesses:
JAMES S. FITCH,
LESLIE M. SAUNDERS.